(12) United States Patent
Kim et al.

(10) Patent No.: US 6,247,813 B1
(45) Date of Patent: Jun. 19, 2001

(54) IRIS IDENTIFICATION SYSTEM AND METHOD OF IDENTIFYING A PERSON THROUGH IRIS RECOGNITION

(75) Inventors: Dae Hoon Kim, Seoul; Jang Soo Ryoo, Daejun, both of (KR)

(73) Assignee: IriTech, Inc., San Jose, CA (US)

( * ) Notice: Subject to any disclaimer, the term of this patent is extended or adjusted under 35 U.S.C. 154(b) by 0 days.

(21) Appl. No.: 09/433,254

(22) Filed: Nov. 4, 1999

(30) Foreign Application Priority Data

Apr. 9, 1999 (KR) ................................. 99-12438
Apr. 9, 1999 (KR) ................................. 99-12439
Apr. 9, 1999 (KR) ................................. 99-12440

(51) Int. Cl.[7] ........................................... A61B 3/14
(52) U.S. Cl. ............................... 351/206; 382/117
(58) Field of Search ................... 351/200, 205, 351/206, 221; 382/115, 117, 182, 181; 235/379, 380, 382, 438; 340/825.31; 902/5

(56) References Cited

U.S. PATENT DOCUMENTS 5,386,104 * 1/1995 Sime ................................ 235/379
5,729,619 * 3/1998 Puma ............................... 382/115

* cited by examiner

Primary Examiner—George Manuel

(57) ABSTRACT

An iris identification system and method of identifying the identity of an animate being through iris scanning are disclosed. The system features an iris system pick-up unit including a camera for capturing iris images to create input image signals. The iris image pick-up unit is operated with a control unit that is interfaced with a data processing unit for preprocessing the input image signals into processed data. The processed data is representative of one of a plurality of parameters for iris identification selected from the group consisting of (1) the density and texture form of the iris fiber structure using a frequency transformation method, (2) pupilliary reaction, (3) the shape of the pupil, (4) autonomous nervous wreath reaction, (5) shape of the autonomous nervous wreath, (6) the existence of lacuna, (7) the location of the lacuna, and (8) the shape of the lacuna. The control unit is operable to compare processed data with parameters pre-stored in a data base that correspond to the processed data parameters to determine a match indicative of a confirmation of identity.

79 Claims, 12 Drawing Sheets

FIG. 1A
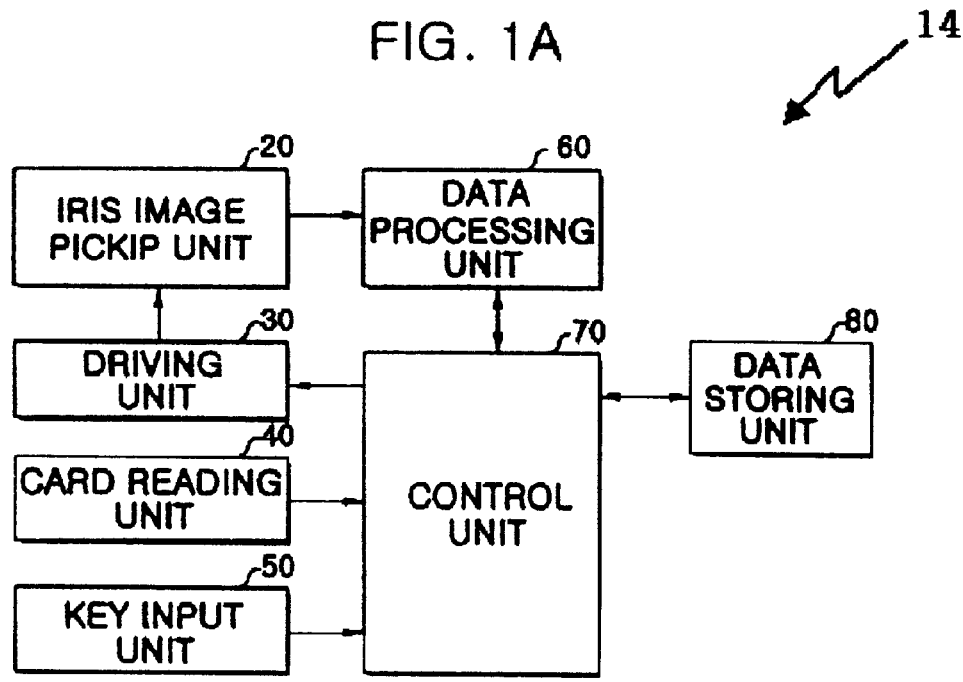
FIG. 1B
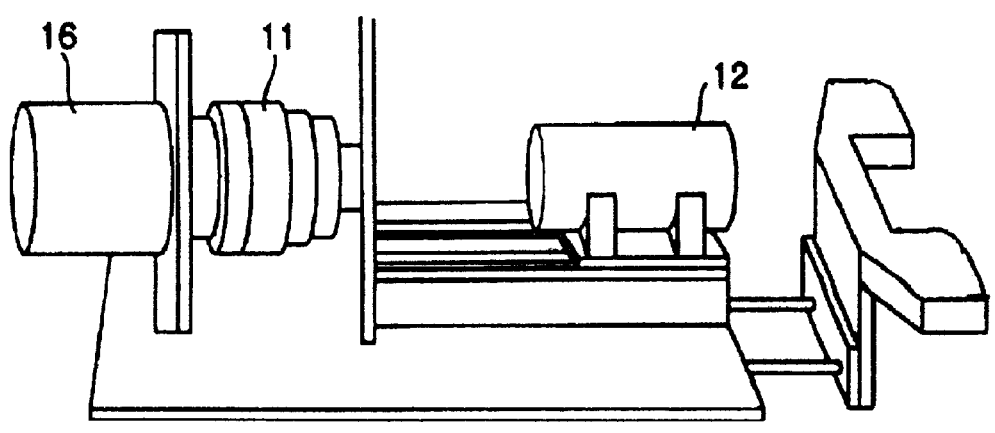

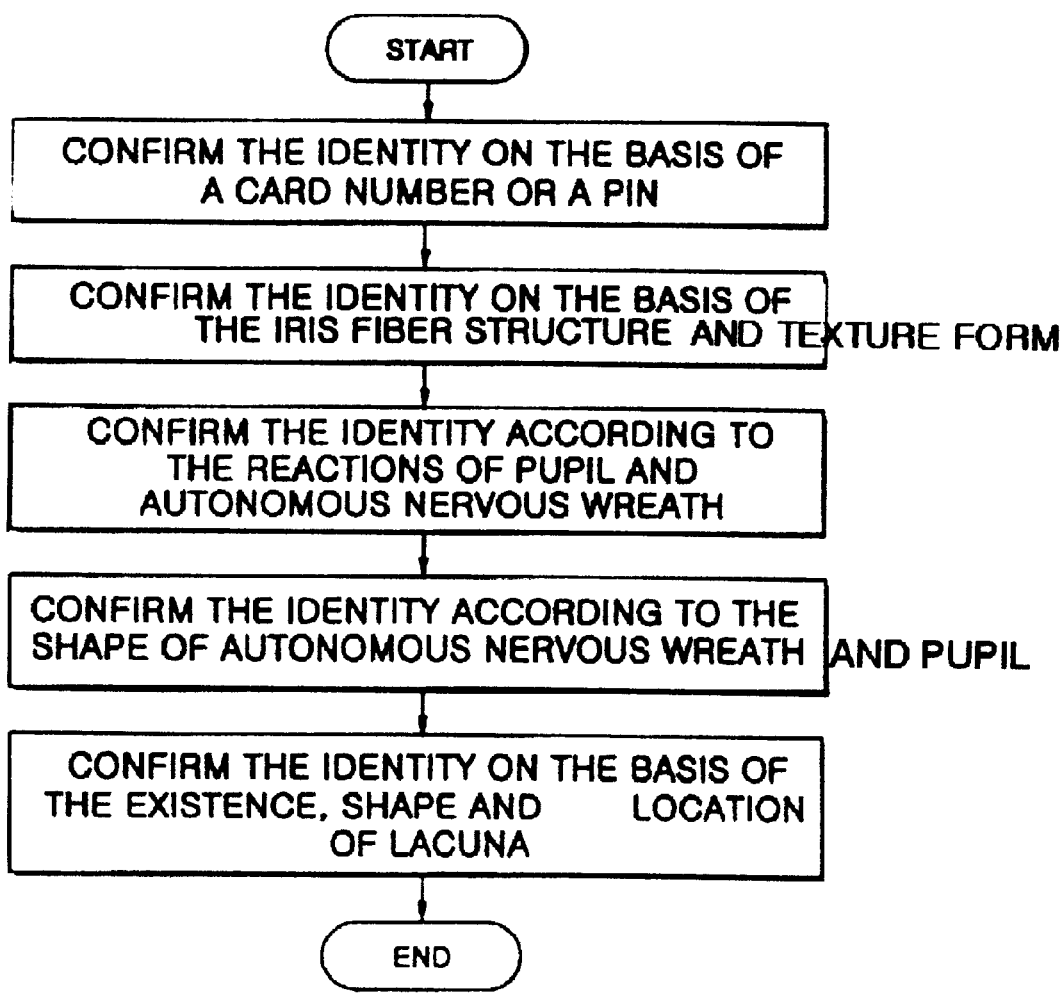

IRIS IDENTIFICATION SYSTEM AND METHOD OF IDENTIFYING A PERSON THROUGH IRIS RECOGNITION

TECHNICAL FIELD

The present invention relates to an iris identification system and method of confirming the identity of a living being by using an iris image. More specifically, the invention relates to an iris identification method by determining one or more identification parameters relating to the iris fiber structure, the shape of an autonomous nervous wreath (ANW) and pupil and their spontaneous reaction to light, and the existence, shape, and location of a lacuna from the iris image.

BACKGROUND ART

A known iris identification system for identifying a specific person compares the iris code from the image signal of the iris portion taken from an eye of a person with the corresponding iris information searched from a database for accepting or rejecting a particular person according to the result of the comparison. This conventional iris identification system, however, has not achieved an acceptably high level of identification accuracy.

Moreover, since various iris identification systems have limitations in distinguishing whether it is observing the real iris of a living human, it cannot be safely used with systems such as banking systems, electronic settlement systems or the like due to the high risk of misidentification of forged iris images.

SUMMARY OF THE INVENTION

It is an object of the present invention to verify the identity of an individual using an iris recognition system having a high level of accuracy.

Another object is to achieve a high level of identification accuracy through analysis of a multiplicity of properties associated with the iris.

Accordingly, one object of the invention is to identify the iris of a living being quickly and clearly by determining a plurality of iris identification parameters according to an iris fiber structure obtainable from an iris image, the reaction of the pupil and autonomous nervous wreath caused by light, the shape of an autonomous nervous wreath and pupil, and the existence, location, and shape of a lacuna.

A system for confirming the identity of an animate being through iris scanning in accordance with the present invention, comprising a control unit for receiving identifier information identifying the animate being, and a data storage unit including a data base accessed by the control unit for containing predetermined personal information associated with an identifiable being for comparison with the identifier information. An iris image pick-up unit including a camera is operated by the control unit when the identifier information corresponds to the predetermined information to initially capture iris images to create input image signals. A data processing unit pre-processes the input image signals into processed data. The storage unit includes, for each identifiable being, at least one of a plurality of pre-stored parameters for iris identification selected from the group consisting of (1) the density and texture form of the iris fiber structure using a frequency transformation method; (2) pupillary reaction; (3) the shape of the pupil; (4) autonomous nervous wreath reaction; (5) the shape of the autonomous nervous wreath; (6) the existence of lacuna; (7) the location of the lacuna; and (8) the shape of the lacuna. The control unit is operable to compare the processed data with the parameter(s) to determine if there is a match indicative of a confirmation of identity.

In accordance with a preferred aspect of the invention, the camera is structured to photograph both eyes of the animate being. The data processing unit separately processes image input signals into processed data representative of each eye. In this manner, a higher level of identification accuracy is achievable to confirm the identity of the animate being through iris scanning.

To access the identification system, a being to be identified initially inputs identifier information into the system. In certain embodiments, the identifier information data may be inputted using a card reading unit, a key input unit, or the like, in which PIN (Personal Identification Number) or some other unique identifier is used to access the system. It is also possible to utilize voice actuated systems.

The iris image pick-up unit preferably includes a light source operated by the control unit in conjunction with the camera to capture, in succession, a plurality of iris images to create the input image signals. By illuminating the eye, it will be appreciated that the iris is caused to contract and, therefore, the succession of images will enable the system to capture the contraction and, if desired, the subsequent dilation of the iris. The light source is preferably an infrared source.

In accordance with another unique feature of the invention, the system features an interface between the iris image pick-up unit and the control unit to enable the camera to be automatically aligned with the user's eye based on accessing predetermined personal information in the data base containing attributes of the user's physique translated into positioning data.

As mentioned above, the system preferably has a capability of analyzing different parameters attributable to iris characteristics. However, the invention is operable to confirm a user's identity by screening and analyzing only one of the aforementioned process parameters or a sub-set of the process parameters up to and including the entire parameter set.

The unique techniques used to analyze the density and texture form of the iris fiber structure preferably includes frequency transformation methods utilizing a Haar Transform. In accordance with a presently preferred embodiment, the invention provides a variable multi-sector system of spectral conversion using Haar Transform functions. With this unique approach, a selected one of the iris images is divided into a multiplicity of sectors in which, for each sector, a number of Haar function coefficients are calculated. This multi-sector system of spectral analysis advantageously enables the exclusion of certain sectors of the iris that are garbled by interferences caused, for example, by the presence of defects or interferences with the eyelid, eyelash, etc. These defects manifest themselves through the generation of high frequency coefficients and through predetermined sharp variations between the coefficients of adjacent sectors. Thus, an adjacent sector by sector analysis enables the unique application of Haar Transformations to iris recognition technology.

Utilizing Haar Transforms, in preferred combination with the selection of Haar coefficients representative of selected low frequency zones, it is possible to create an iris reference record having an unprecedented high level of recognition accuracy. The present invention, in certain embodiments, utilizes the successive series of iris images to generate a pupil histogram or pupillogram which is represented by a curve showing iris contraction and dilation over time. The present invention provides novel techniques for analyzing the pupillogram by analysis of its gradient changes as a further means for improving identification accuracy. The present invention also features analysis of the pupil boundary, shape and orientation as a further means of improving identification accuracy.

The present invention also processes information relating to the shape and reaction of the autonomous nervous wreath as well as the existence, location and shape of lacuna, if any, as a further means of enhancing identification accuracy.

The present invention also contemplates and makes possible the analysis of the foregoing iris identification parameters for systems and uses other than iris identification. It is within the scope of this invention, for example, to create a system for testing individuals for the presence or use of drugs or alcohol. In this type of system, there is provided a control unit for receiving identifier information identifying the animate being, and a data storage unit including a data base accessed by the control unit for containing predetermined personal information associated with an identifiable being for comparison with the identifier information. An iris image pick-up unit includes a camera operated by the control unit for capturing iris images to create input image signals. A data processing unit pre-processes the input image signals into processed data. The control unit is operable to process data taken as a result of the processing of the input image signals to represent the average contraction and dilation of the iris pupil in response to a light stimulus over time to thereby determine whether the processed data is indicative of actual or recent intoxication. This system is premised on the discovery that the shape of the curve of the pupillogram is different when a person is intoxicated with alcohol or drugs relative to the shape of the curve when the person is alcohol or drug free. The ratio of pupillogram curve characteristics of the left and right eyes of the person is a further means for determining actual or recent intoxication. The ratio of curve characteristics of a recent or presently intoxicated person differs from the ratio of curve characteristics when the person is alcohol or drug free.

Methods for confirming the identity of animate beings, or for testing for the presence of at least one of drugs and alcohol in a person's body, are also provided by the present invention based upon the unique selection of iris identification parameters as described above.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1A is a block diagram of an exemplary system for identifying the iris of a living being according to the present invention;

FIG. 1B is a perspective side view of a camera representing an embodiment of an iris image pick-up unit in the FIG. 1A embodiment and an illumination system thereof;

FIG. 9 is a high level flowchart to explain the entire operation of the iris identification method of the invention;

DETAILED DESCRIPTION OF THE DRAWINGS

Figure 2:
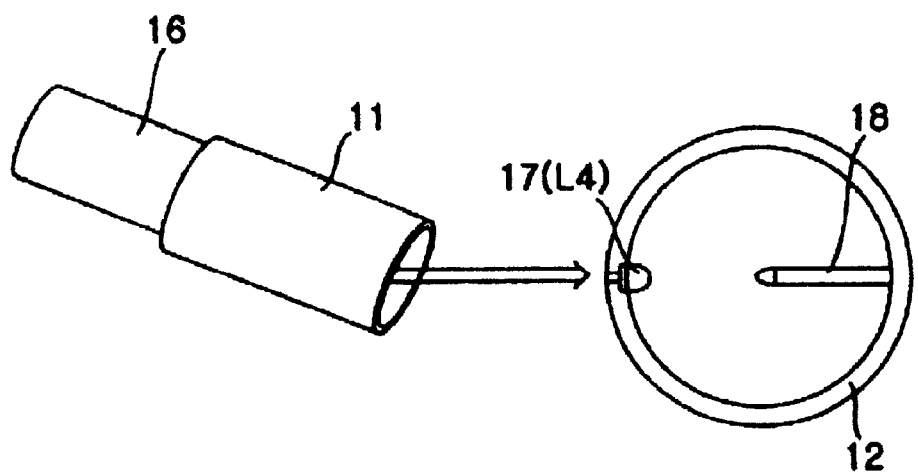
FIG. 2 is a reference drawing partially taken from the FIG. 1B to describe a vision pointer used for the iris image pickup unit of FIG. 1B.

FIG. 1A is a block diagram of a system 14 for identifying the iris of a living being according to the invention. A living being includes any animate being with an iris for identification including humans and animals. The system 14 preferably comprises a card reading unit 40 that reads, by accessing information recording media of a card, and identifies information recorded on the card storing a personal card number. A key input unit 50, having a plurality of keys for inputting PINs, generates electrical signals corresponding to each key input. An iris image pickup unit 20 has a plurality of light sources that blink automatically in sequence according to a predetermined order of specific control signals to enable a camera with an auto-focusing function to capture dynamic images of the iris for a number of seconds (e.g. at speeds generating more than 25 frames a second). A driving unit 30 provides the iris image pickup unit 20 with power for illumination and adjustment of the camera position by supplying a particular control signal with use of a motor.

A data processing unit 60 pre-processes the input image signal captured by the iris image pickup unit 20. A data storing unit 80 forms a database for storing a plurality of identification parameters including 1) the density and texture form of the iris fiber structure extractable from the image signal of individual irises, 2) the motion of the autonomous nervous wreath (ANW) in response to light, 3) the motion of the pupil in response to light, 4) the shape of the ANW, 5) the shape of the pupil, 6) the existence, location and shape of lacuna, in association with each personal card number or PIN of each person, respectively. A control unit 70 discerns the iris for a particular person by confirming a user's identity by searching the database for the card number or PIN inputted or read by the card reading unit or key input unit, acquiring dynamic iris images, adjusting the position of the camera automatically on the basis of the personal information, and determining a plurality of iris identification parameters for ascertaining the user's identity from the image signals. In this case, not only the iris information for a particular person but additional information for each person (for instance, personal stature information pertinent to the camera height when capturing the iris image, or most appropriate camera height to each person) can be stored in the data storing unit 80, such that the unit 80 can adjust the camera height automatically by reading the additional information.

FIG. 1B is a perspective side view of one portion of a binocular camera and an illumination system representing an exemplary illustration of the iris image pickup unit 20 of FIG. 1A. The iris image pickup unit 20 is provided with a camera 16 and a plurality of first and second lenses 11 and 12 at required places to capture images of the iris. It is preferable to use the camera 16 having a variable capturing zone(flex zone) for auto-focusing. Further, it is preferable to use the second lens 12 having a focal depth of more than 5 mm to prevent degradation of the auto-focusing function as a result of movement of the user's eye lids, eye lashes, and eye blinking. The first and second lenses 11, 12 are preferably provided for each eye.

Figure 3:
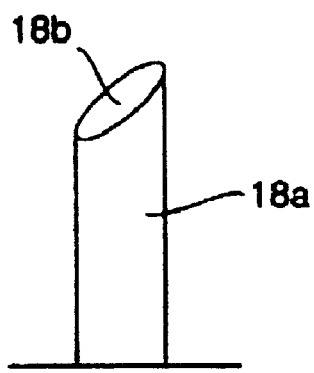
FIG. 3 is a detailed view of the vision pointer in FIG. 2.
Figure 4:
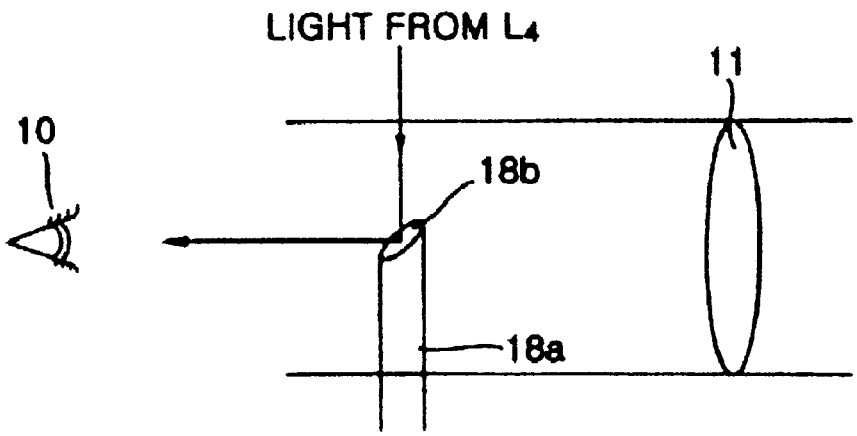
FIG. 4 is a reference drawing to describe the vision pointer in FIG. 2 which reflects a vision guide light source to a user's eye.

The iris image pickup unit 20 is further provided with a vision guide unit 18 (see FIGS. 2–4) to prevent biasing of the iris to one side by fixing the user's eyes on the central portion of the camera in conjunction with the iris image pickup unit 20 of the FIG. 1B. Further, in some circumstances, side light sources can be used for initial auto-focusing and luminance adjustment. FIG. 2 is a reference view taken from FIG. 1B to describe the vision pointer and FIG. 3 shows the vision pointer of FIG. 2 in detail. FIG. 4 is a reference drawing to describe the operation of the vision pointer in FIG. 2 which reflects the light from the vision guide light source L4 to the user's eyes.

As shown in FIGS. 2–4, the vision guide unit can be composed of the guide light source L4 (also denoted with reference numeral 17) emitting a thin blue or red light to guide the user's vision. A reflection unit 18b reflects the light from the light source 17 away from the central portion of the camera 16 and a support unit 18a supports the reflection unit in alignment with the center of the lens. In this case, the support unit 18a is preferably constructed with a transparent glass-like material to avoid affecting the iris image even when placed at the center of the lens. Reflection unit 18b has a certain inclination and a mirrored surface to reflect the light from the vision guide light source L4 to the user's eye.

Figure 5:
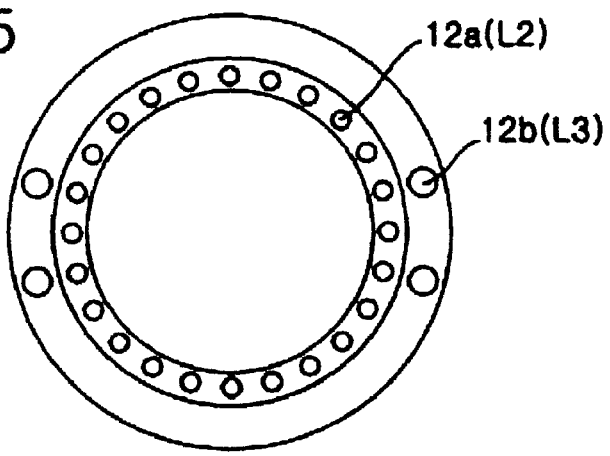
FIG. 5 is a front view of a second lens in the FIG. 1B system.

FIG. 5 is a front view of the second lens 12 of FIG. 1B. In a certain location of the second lens front 12, there is provided a flash light source L3 (12b) which stimulates movement (i.e. constriction or dilation) of the pupil and the ANW. A plurality of infrared light sources L2 (12a) are arranged in a circular or ring array along the periphery of the lens 12 and are controlled by software to enable the camera 16 to capture the iris image and a clear pupillary image. The flash light source 12b is preferably a blue diode controlled by software to light automatically in a short cycle.

Figure 6:
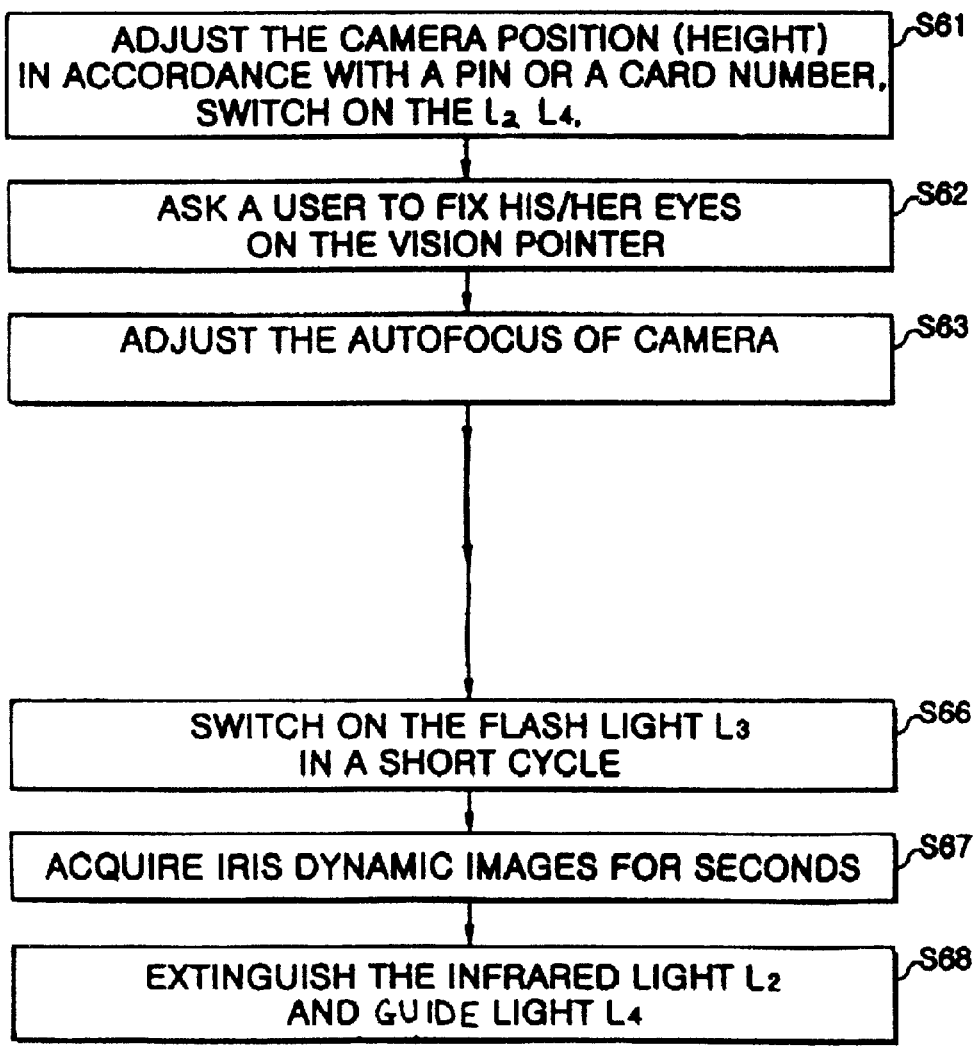
FIG. 6 is a flowchart of an example of image signal capturing at the iris image pickup unit performed by computer control.

FIG. 6 is a flowchart of an example of image signal capture with the iris image pickup unit 20 carried out by computer control. In adjusting step S61, the camera position (height) is adjusted by using the personal information searched from the database on the basis of the card number or the PIN, and the plurality of light sources (12a and 17) are simultaneously switched on for auto-focusing and attracting the user's eyes to the object lens. In step S62, the user's eyes are guided to the object lens by using the lighted light source 17. Auto-focusing of the camera occurs in step S63. In step S67, the dynamic image of the ANW and pupil in movement is acquired for a period of seconds with the lighting (S66) of light source 12b in a short cycle which induces the movement of the pupil and ANW of the iris. In step S68, all the lighted light sources are extinguished after the foregoing steps, S61–S68.

Figure 7:
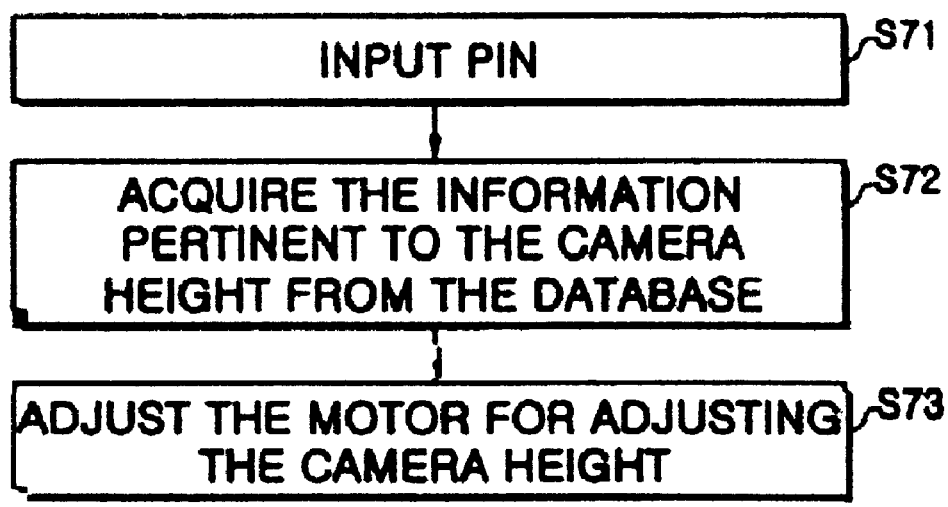
FIG. 7 is a flowchart of an example of the height adjustment of the camera in FIG. 6.

FIG. 7 is a flowchart of the detail of adjusting the camera height in step S61 of FIG. 6, the flowchart comprising the following steps: inputting a card number or a PIN (S71); acquiring the information relating to the camera height of the corresponding person by searching the database with the inputted card number or PIN (S72); and adjusting the camera height suitable to the corresponding person by rotating the motor in a forwarded or reverse direction (S73) after comparing the acquired information of camera height with the information of the present height of the camera.

Figure 8:
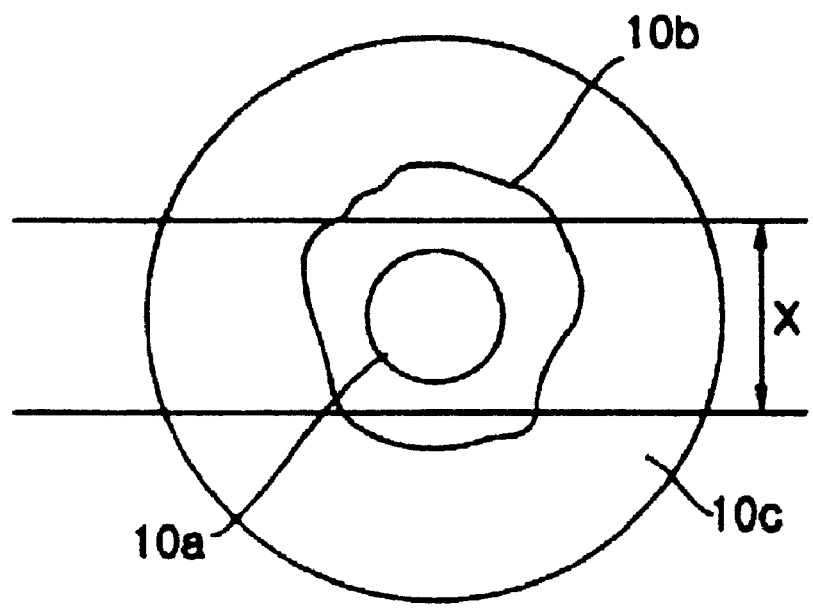
FIG. 8 is an exemplary view of the iris image to describe the selected region(x) of the input image signal required for the iris analysis.

FIG. 8 is an exemplary view of the iris image to describe the selection zone(x)of the input image signal required to make the iris analysis according to one embodiment of the invention. The zone that should be selected to analyze the iris should include at least a portion of the ANW 10b and the entire pupil 10a. In addition, the selection zone(x) is preferably a portion seen clearly and not affected by the eyelids, eyelashes, etc., and is set within the range greater than one third and less than one half of the iris diameter.

Figure 16:
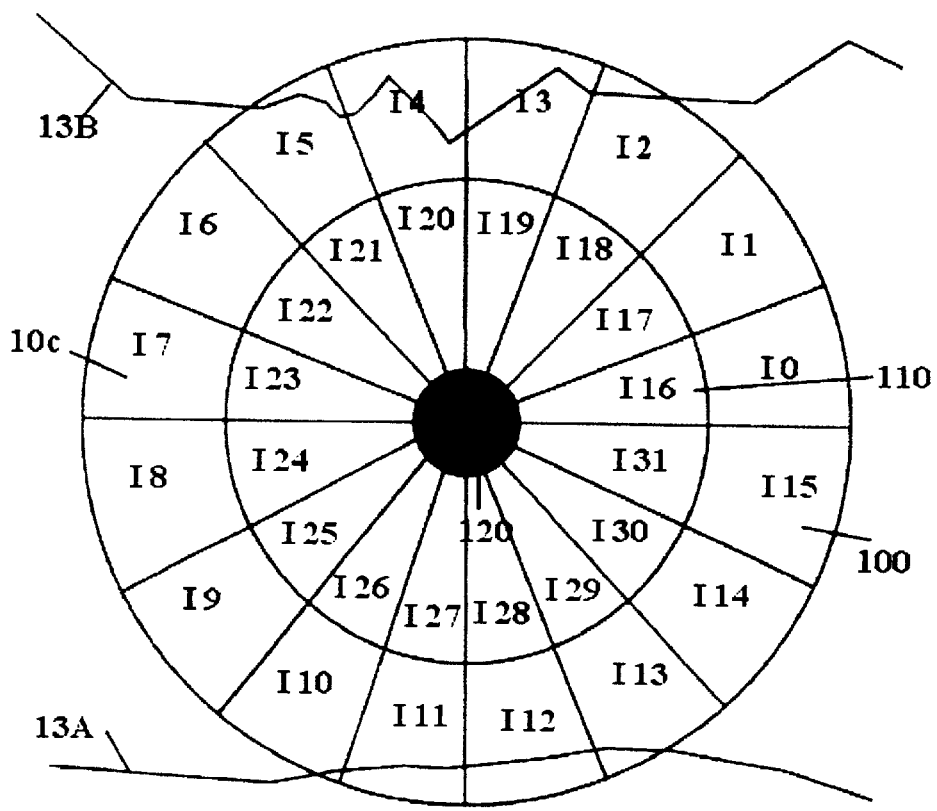
FIG. 16 is an exemplary view of the iris image to describe the Variable Multisector System of Spectral Conversion.

FIG. 16 is an exemplary view of the iris image analysis employing the variable multisector system of spectral analysis in a preferred embodiment of the invention, as more fully described below. The variable multi-sector system of spectral analysis enables the selection of the visible portions of the iris, not garbled by interference, for analysis, thus increasing the reliability of the identification process. Anatomic features of the eye aperture and tumescence of the eyelids are identifiable and excludable. Defects or interference with borders not able to be approximated beforehand, i.e., glare, are identifiable and excludable.

Figure 10A:
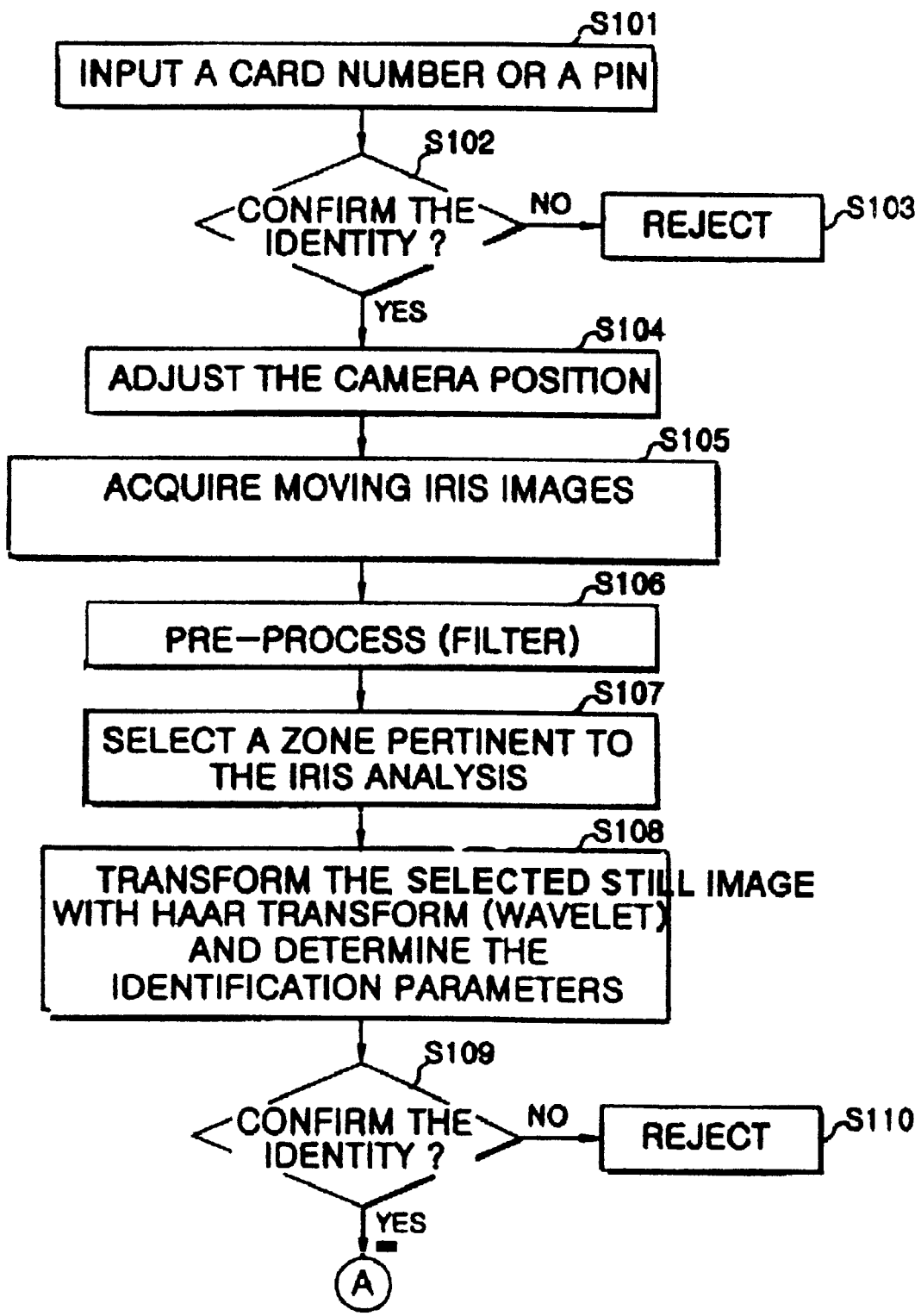
FIGS. 10A–10C are detailed sequential flowcharts of the FIG. 9 flowchart.
Figure 10B:
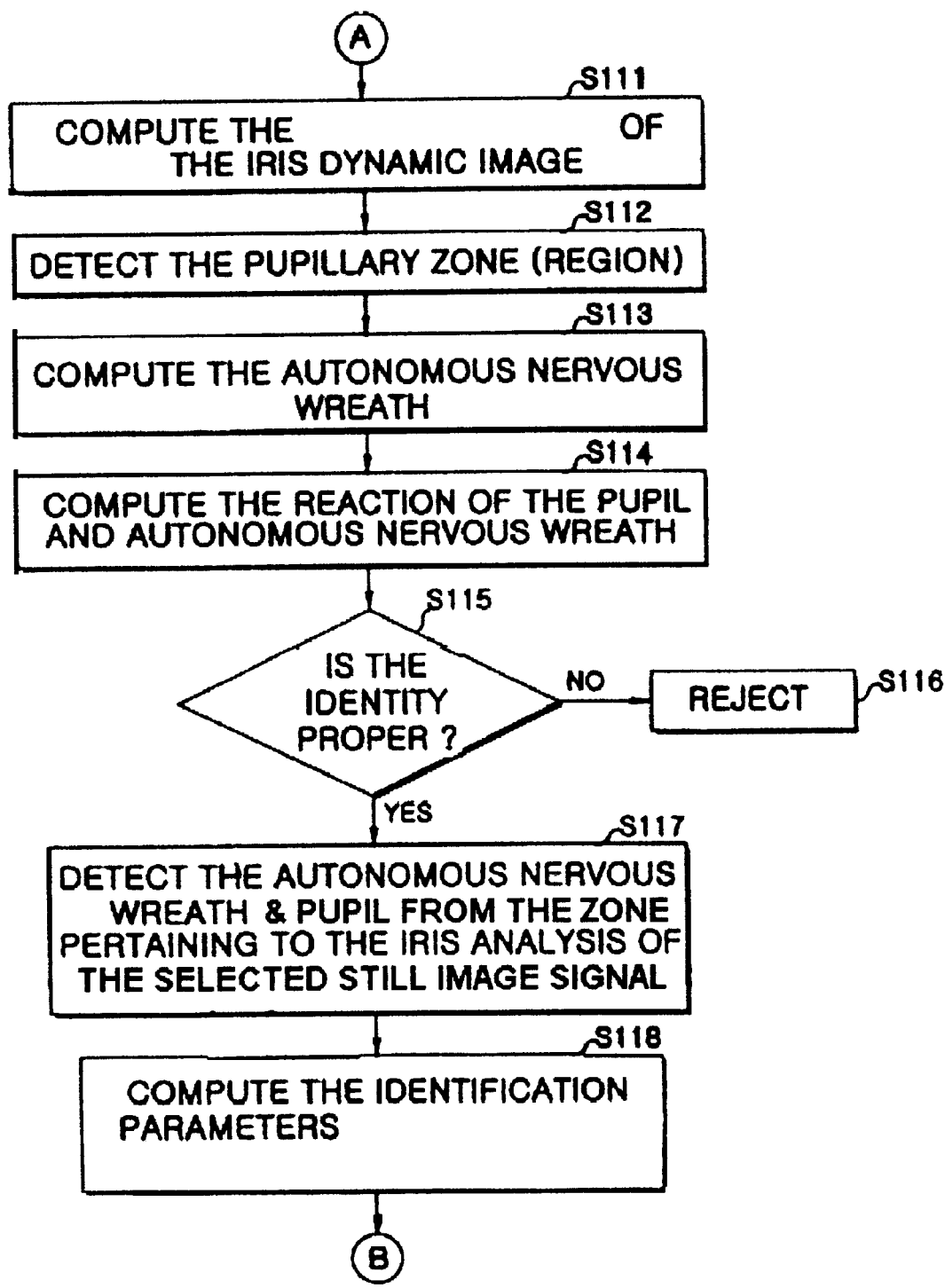
Figure 10C:
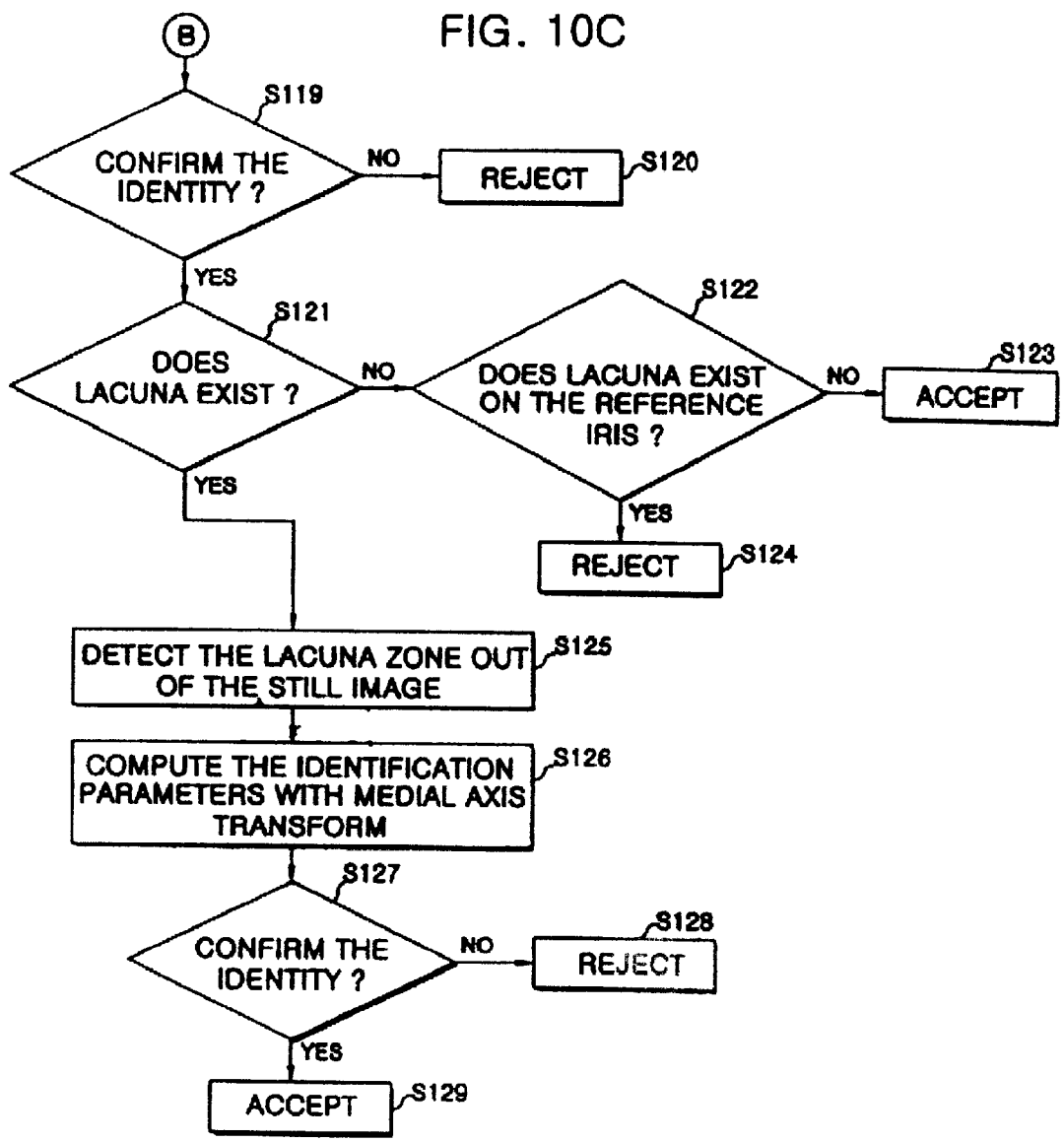

FIG. 9 is a high level flowchart to describe the entire iris identification method of the present invention, while FIGS. 10A–10C are detailed sequential flowcharts of the steps of the high level flowchart of FIG. 9.

As depicted in FIGS. 10A–10C, in the iris identification method according to the present invention, a variety of embodiments can be realized by including one or more of the following processes. First, a card number or PIN confirmation process S101–S103 ascertains a user's identity by searching and obtaining personal information according to the corresponding number from the database. After the card number or the PIN is inputted, an image acquiring process S104–S105 acquires dynamic iris images by adjusting the camera position according to the user's personal information obtained during the confirmation process and controlling the plurality of light sources.

The different identification parameters that may be obtained and analyzed in accordance with the present invention will now be described.

DENSITY AND TEXTURE FORM OF IRIS FIBER STRUCTURE

An iris fiber structure confirmation process S106–S110 is used to ascertain the user's identity with corresponding identification parameters, after determining identification parameters by transforming the image signal of the zone pertaining to the iris analysis with a Wavelet Transform of the selected still iris image acquired during the foregoing process. The transform can be applied to the zone of FIG. 8 or to an individual sector of FIG. 16 as described below in connection with the variable multisector system of spectral analysis.

In an embodiment of the present invention, the iris fiber structure confirmation process can be comprised of the steps of: selecting S106, S107 (FIG. 10A) a zone (selection zone x; essentially including a portion of the ANW and entire pupil, within the range larger than one third and smaller than one half of the iris diameter) pertaining to the iris image analysis by pre-processing the dynamic signal of the iris image; determining in step S108 the identification parameters from the Wavelet Transform coefficients representing the specialized information on the iris fiber structure density and texture form after transforming the selected still image signal of the selection zone with a two-dimensional Wavelet Transform(for example, such Wavelet Transform as Haar Transform); and confirming with steps S109, S110 the user's identity by searching the corresponding parameters from the database.

Wavelet Transform

In general, the density and texture form of the iris fiber structure is different from one person to another. If the Wavelet Transform (especially, a Wavelet Transform such as the Haar Transform) containing the information relevant to the density mainly at the low frequency zone is performed, then, in particular, low frequency components of the two-dimensional Haar Transform coefficients have the most information on the iris fiber density and texture form.

Low frequency components are selected having the most information of the iris fiber density and texture form by performing the Wavelet Transform for the selected iris image signal as described above, determining the frequency characteristic, and fixing the selected low frequency coefficients of the two dimensional Haar Transform, which shows the frequency characteristic, as identification parameters.

The Haar Transform applied as such in the invention is symmetric, separable and unitary, and uses the following Haar function varied according to the size(scale) and location.

An additional Haar function is defined as follows:

$$\varphi[t] = \begin{cases} 1 & 0 \le t < \frac{1}{2} \\ -1 & \frac{1}{2} \le t < 1 \\ 0 & \text{otherwise} \end{cases}$$

$$\varphi_{m,n}[t] = 2^{-m/2}\varphi[2^{-m}t - n], m, n \in Z.$$

For simplification of the spectral analysis algorithm, a preferred embodiment excludes the normalizing factor $2^{-m/2}$. Therefore, the definition of the above function becomes:

$$\varphi_{m,n}[t] = \varphi[2^{-m}t - n], m, n \in Z.$$

This function is also referred to as signum Haar functions. The binary number of the function determines the order of the function in the listing.

It would be a tremendous calculation due to the large size of the image, when determining the actual Haar Transform, in the present invention; however, the computation time is greatly improved with the Butterfly Structure of Transformation Flow Graph.

Figure 15:
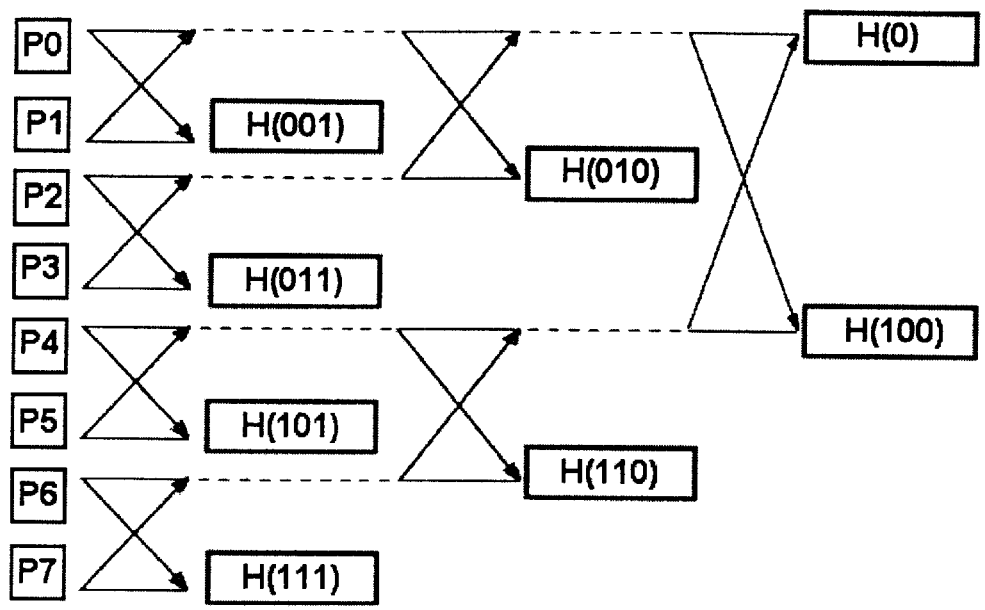
FIG. 15 is a diagram of the Butterfly Structure of Haar Transformation Flow Graph.

A graphical depiction of the fast spectral conversion algorithm by signum Haar functions is shown in FIG. 15 (wherein n=8), representing the Butterfly Structure of Transformation Flow Graph. Along the vertical axis of the graph are P0–P7 indicating the pixel values to be converted.

In this flow graph, the value for each successive level proceeding to the right depends upon the previous values based on the following equations:

$$X[n]=(x[n]+x[m])/2;$$

$$X[m]=(x[n]-x[m])$$

where m=n+1 and X[n] is the brightness of pixel n.

As a result of using the Butterfly Structure of Transformation Flow Graph, the spectral conversion program by Haar functions operates more than 200 times faster than prior approaches.

Variable Multisector Analysis

Described below is the variable multisector system of spectral conversion using Haar functions. The variable multisector system is preferred over the zone selection method disclosed above in connection with FIG. 8. Occasionally, interference in the form of glare, eyelids, and eyelashes occur in sections of the iris or the large visible portion of the iris is unavailable for analysis. Interference or unavailability of portions of the iris reduces the number of sectors available for comparison resulting in decreased reliability of person identification.

Image analysis begins by dividing the iris image into an outer ring 100, as shown in FIG. 16, and an inner circular zone that includes the pupil 120. The border separating the outer internal and external ring 100 from the circular zone, is set at the distance of 50 pixels from the iris radix. A greater or lesser value than 50 pixels may be used in additional embodiments. The outer border of the outer ring begins approximately at the sclera-iris border. The outer ring diameter can vary due to many factors, such as differing iris sizes between individuals, differing ranges at which the iris image is obtained and so on. Since the portions of the iris corresponding to the outer ring 100 and the area 110 between the pupil 120 and the outer ring 100 contract and dilate at different rates, different normalization factors are used for the inner and outer rings.

In the presently preferred embodiment, each area 100, 110 is then radially subdivided into 16 preferably equal-sized sectors, a total of 32 sectors indicated by reference characters $I_0$–$I_{31}$. For each of the 32 sectors $I_0$–$I_{31}$, 1,024 Haar function coefficients are calculated, using a Wavelet Transform as described above, forming a 32×32 matrix. However, it is within the scope of the invention that the total number of sectors (n+p) in all zones, the number of sectors in each individual zone (n, p), the size of the sectors and the number of Haar function coefficients may vary. That is, each zone may have a differing number of sectors (n, p), i.e., the area 110 may be radially divided into 10 sectors (p=10) while the outer ring 100 is radially divided into 16 sectors (n=16).

Next, sectors occluded or interfered by eyelids, generally indicated by reference character 13A and 13B for the lower and upper eyelids respectively, or eyelashes are rejected through adjacent sector coefficient comparison. Upon comparison of adjacent sector coefficients, if a sharp variation of high frequency coefficients is observed, the sector is rejected as defective. Referring to FIG. 16, sector comparison is performed through groups of four sectors beginning at the horizontal line separating sector 0 from 15 and 7 from 8 and proceeding clockwise or counter-clockwise through the adjacent sectors. In this manner, sectors $I_0$–$I_3$, $I_7$–$I_4$, $I_8$–$I_{11}$, and $I_{15-I12}$ are compared.

For example, the high frequency coefficients in sector $I_0$ and $I_1$ are compared and if the difference does not exceed a predetermined sector high frequency coefficient threshold value, sector $I_1$ is recognized as good. Sector $I_0$ is recognized as good or it would have been rejected during the analysis of the pupil as closed by eyelids. Next, sectors $I_1$ and $I_2$ coefficients are compared and, as seen in FIG. 16, the eyelid border is located in sector $I_2$. The border in sector $I_2$ will cause the difference to exceed the sector high frequency coefficient threshold and sector $I_2$ will be rejected. After the rejection of sector $I_2$, sector $I_3$ will likewise be rejected. A similar process will be repeated for the remaining quadrant sectors.

After removing the rejected sectors from the analysis, a subset of the complete 1,024 Haar coefficients are selected. The number of coefficients selected is determined by several factors. Too many coefficients needlessly increases the size of the database, too few coefficients deteriorates the quality of the recognition. Additionally, some coefficients are not selected because they change considerably with the change of image luminance and some high frequency coefficients include too much noise. As a result of experimentation, a preferred embodiment uses 31 coefficients selected from the 32×32 matrix of the 1,024 Haar coefficients. The particular matrix location of the coefficients selected are as follows: (0,1), (1,0), (1,1), (0,2), (0,3), (2,0), (3,0), (1,2), (1,3), (2,1), (3,1), (0,4), (0,5), (0,6), (0,7), (4,0), (5,0), (6,0), (7,0), (1,4), (1,5), (1,6), (1,7), (4,1), (5,1), (6,1), (7,1), (2,2), (3,2), (2,3), and (3,3). Greater or lesser numbers of coefficients may be used in different embodiments.

Selection of the 31 coefficients from each of the 32 sectors $I_0$–$I_{31}$ enables the creation of an iris reference record approximately 1 kilobyte in size. The first 32 bits of the record contain the sector rejection analysis results.

New iris images to be identified are processed in the same manner as the reference images described above. The characteristic record obtained is compared with all iris reference records in the database. The sum of the difference between the input and reference iris coefficients is calculated on a sector by sector basis. The summed value is within a range of 0 to 2 due to coefficient normalization. A summed value of 1 represents an absolutely gray image, 0 represents complete coincidence of sector spectra, and 2 represents equal module but opposite sign spectra.

After direct experimentation, it has been determined that some sectors differ from the reference sectors due to peristaltic of the iris (quick spontaneous movements of some areas of the iris). Thus, only those sectors wherein the summed value is less than 1 are preferably used in the iris image analysis. In this fashion, sectors spoiled by peristaltic are added to the rejected sectors and excluded from the recognition attempt. The minimum number of sectors used in the iris image analysis is 10 for each eye. Fewer sectors could be used with a corresponding decrease in recognition quality. The results of comparing sector coefficients are multiplied in order to emphasize differences. Therefore, if the image to be identified coincides with the reference image, the resulting value will be close to 0. In contrast, differing image resulting values will be in the range of hundreds or thousands.

From the result of the Haar Transformation, the coefficients of the experimentally selected low frequency zone are utilized for identification since the low frequency spectral coefficients contain much information on the density and texture form of the iris fiber structure.

Autonomous Nervous Wreath and Pupil Reaction

A pupil and ANW reaction confirmation process S111–S116 of FIG. 10B ascertains the user's identity via corresponding identification parameters by detecting the pupil and ANW from the acquired iris dynamic image. The identification parameters are then determined using the dynamic reaction (contraction and dilation) of the pupil and ANW from the detected dynamic image signal.

Further, in an embodiment of the present invention, a pupil and ANW reaction confirmation process can be comprised of the steps of: detecting the pupillary zone by computing the central portion of the acquired dynamic image of the iris (S111–S112 of FIG. 10B); computing the zone of the ANW (S113); determining identification parameters respectively for recognizing the living pupil and ANW (S114) after computing the reaction (dilation or contraction) time of the moving pupil and ANW in the detected zone; and confirming the user's identity by searching the corresponding parameters from the database(S115, S116).

Figure 11:
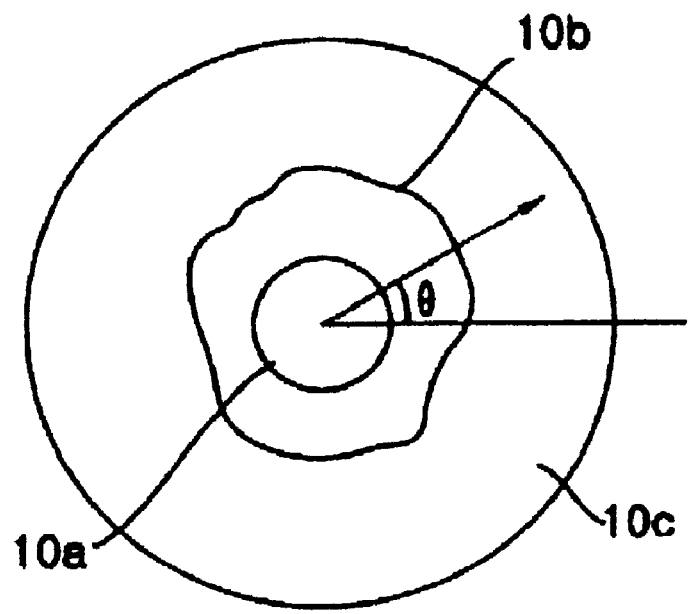
FIG. 11 is an example of the iris image to describe the movement of the dynamic iris and autonomous nervous wreath at a certain angle θ.
Figure 12:
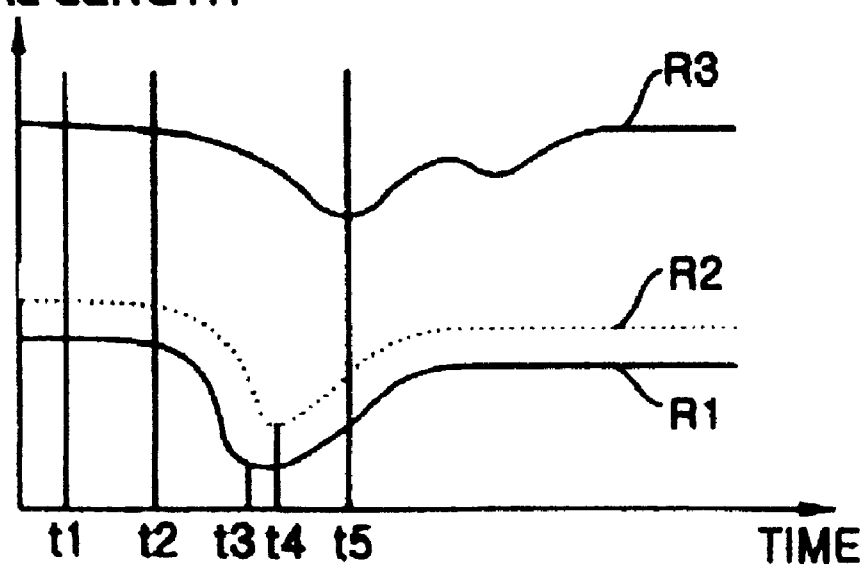
FIG. 12 is a graph corresponding to and representing the radii of the pupil of FIG. 11, in the form of a pupil histogram or pupillogram, and the autonomous nervous wreath transformed into one-dimensional data with a time variation.

FIG. 11 is an exemplary image of an iris 10c to describe the movement of pupil 10a and ANW 10b at a certain angle θ, and FIG. 12 is a graph illustrating an average pupillary radius R1, a pupillary radius R2 at a certain angle θ, and a radius R3 of the ANW at a certain angle θ, transformed in one dimensional data with the time variation. On the graphical illustration, the first time 't1' represents the operation time of a flash light source, the second time 't2' the starting time of contraction of R1, the third time 't3' when the average pupillary radius is minimum, the fourth time 't4' when the pupillary radius is minimum at a certain angle θ, the fifth time 't5' when the radius of the ANW is minimum at a certain angle θ. Therefore, as a result of the comparison of these dynamic images, respective identification parameters can be obtained through the reaction of the pupil and ANW reacting spontaneously to light.

For the above purpose, the invention utilizes a predetermined reference value considered representative of a living being if the movement of the pupillary radius exceeds a certain percentage (e.g. greater than 5 per cent) when the pupil is contracted. The pupillary edge, also, must be detected from the captured iris dynamic image to observe the movement of the pupil. Presently, it is possible to detect the pupillary edge after deciding the approximate center of the iris by using the Symmetry Center Search Algorithm.

With this method, it can be possible to identify the iris without any error even though the iris image may not be captured on its center and is biased somewhat to the right or left.

When the iris image is too lop-sided to identify, it can be captured again. Also, when other images are taken rather than the iris image, it is possible to discriminate between true images and false images in many cases.

In the above-mentioned Symmetry Center Search Algorithm, the following function F(i) is obtained with respect to the horizontal and vertical lines of the image.

$$F(i) = \sum_{k=-N}^{N} \phi(k)x(i+k)$$

$$\text{Where, } \phi(k) = \begin{cases} 1, (k \geq 0) \\ -1, (k < 0) \end{cases} \text{ and,}$$

N is the length of the image line, x(i) is the luminance of the 'i'th pixel of the horizontal or vertical line, while x(i)=x(0) when i≦0, and x(i)=x(N) when i≧N.

In such a case, the domain(i) of definition which minimize the absolute value of function F(i) is at the center of the symmetry. With these methods applied to the horizontal and vertical lines, then the point on which the domains(i), minimizing the absolute value of function F(i), of definition intersect is set as the center of the symmetry. If the domains (i) of definition of the horizontal and vertical lines do not intersect, but are scattered, especially if they deviate from a predetermined range, this signifies that the captured image is not the iris image or the iris image is too biased to the right or left; hence, the iris image should be re-captured before proceeding with any further identification.

In the case where the dynamic image is taken of the above iris, the pupil and ANW are caused to contract and dilate by flash light source 12b. The movements of the pupil and ANW do not occur simultaneously and show different types according to each person. The parameters from the pupillary and ANW reaction (FIGS. 11 and 12) obtained from the movements not taking place at the same time as such are used for the identification.

Figures 17, 18:
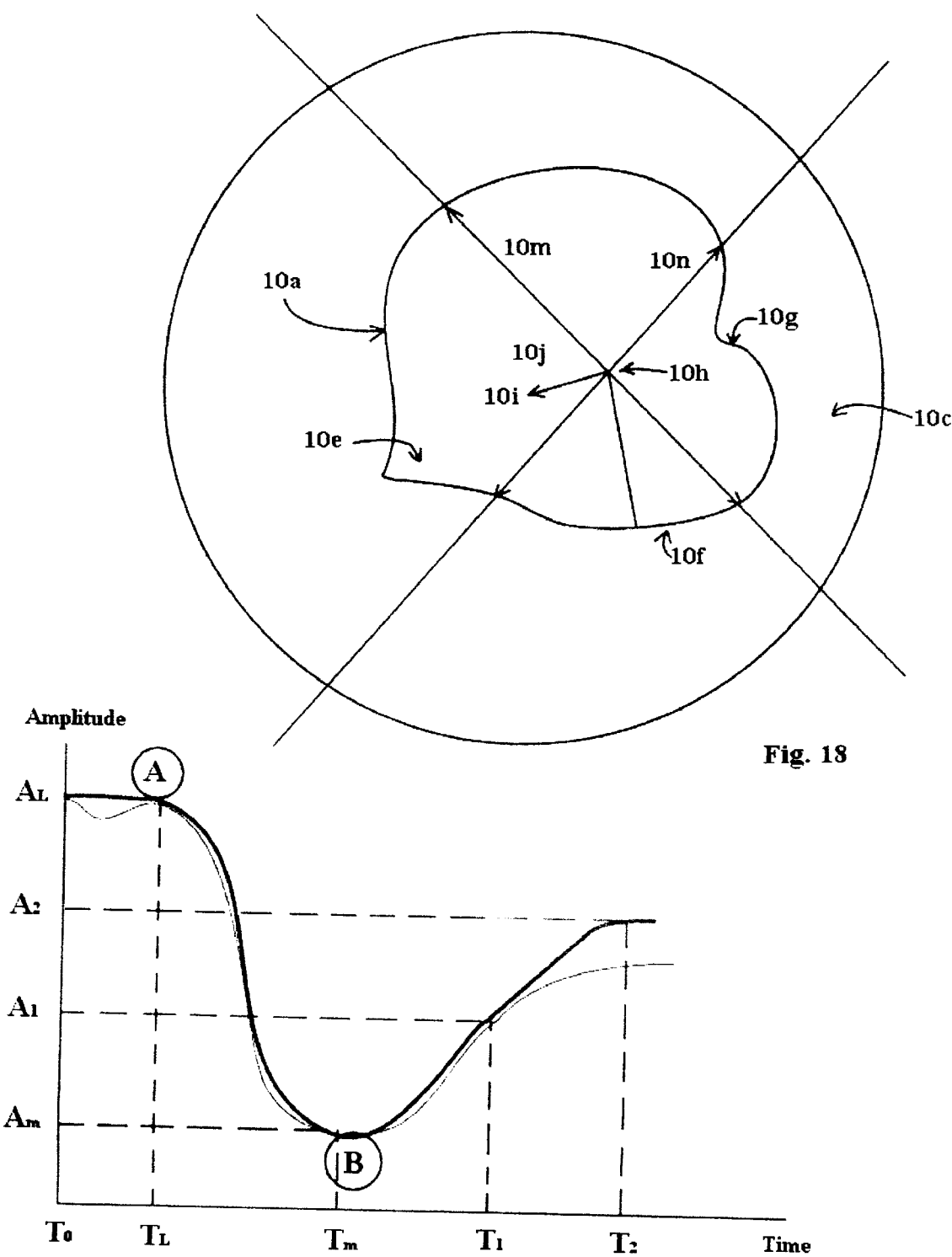
FIG. 17 is a graph of another pupillogram of the average radius of the pupil over time.
FIG. 18 is an exemplary view of the pupil including pupil feature information to be extracted.

Referring now to FIG. 17, a pupillogram or pupil histogram represents the average contraction and dilation of a pupil in response to a light flash at time $T_0$. The vertical axis indicates the amplitude or radius of the pupil, while the horizontal axis indicates time beginning at $T_0$ or the time of the light flash. $T_L$ is the time at which the pupil begins contracting in response to the light flash; $T_L-T_0$ is the pupil response latency time. $A_L$ is the average radius of the pupil prior to the light flash. $T_M$ is the time at which the pupil has contracted to the minimum radius, $A_m$. The time for the pupil to contract, excluding the latency time, is $T_M-T_L$, or $T_P$. $T_1$ and $T_2$ are respectively the time of the 40th and 70th frame of the dynamic iris image and $A_1$ and $A_2$ are the corresponding radii of the pupil at times $T_1$ and $T_2$. $S_P$ is the speed of the pupil contraction between $T_L$ and $T_M$. $D_{AB}$ is the linear distance along the curve of pupil contraction between $T_L$ and $T_M$. %$A_1$ is the ratio of the pupil dilation distance at $T_1$, or $A_1-A_m$, to the average pupil contraction distance or $A_L-A_m$. %$A_2$ is the ratio of dilation distance at $T_2$, or $A_2-A_m$, to the average pupil contraction distance or $A_L-A_m$.

Because pupillograms of persons using drugs or alcohol differ from the pupillograms of non-drug or alcohol using persons, the pupillogram may be used to detect drug and/or alcohol use by individuals. The pupillogram of a person using drugs has a slower than normal time for the pupil to contract to the minimum radius, $T_M$. The pupillogram of a person using alcohol is more flat in comparison to a non-alcohol using person, that is, $D_{AB}$ is smaller for the alcohol user. Also, %$A_1$ and %$A_2$ are smaller for the alcohol user.

In order to detect the presence of drug and/or alcohol within a person's body, the value of parameters $D_{AB}$, $S_P$, $T_2-T_0$, $T_M$, %$A_1$ and %$A_2$ for each pupil (left and right) are detected using a pupillogram. A ratio of values between the left and right eyes for each of these parameters is also computed. The detected and computed values are then compared to a normal, non-drug or alcohol using person's values; the normal person values are derived through experimentation. If the detected parameter values are much lower or smaller than the normal person values, then drug and/or alcohol use has been detected. If the detected parameter values approximately equal or exceed the normal person values, then drug and/or alcohol use has not been detected. This is because the pupil of a drug and/or alcohol using person reacts more slowly and contracts a smaller amount in comparison to a non-drug and/or alcohol using person.

Further, the ratio of the left and right pupil reaction of a person may be used to determine the presence of drugs and/or alcohol in the person's body. The ratios of the previously defined values $D_{AB}$, $S_P$, $T_2-T_0$, $T_M$, %$A_1$ and %$A_2$ for the left and right pupil are compared after calculation as described above. If the ratios are much larger or smaller than 1:1 by more than approximately 15%, then drug and/or alcohol use has been detected. If the ratios are approximately 1:1, then drug and/or alcohol use has not been detected. A drug and/or alcohol using person has less coordination between the left and right pupillary reactions, thus a significant difference in the ratio of left and right pupil reaction is indicative of drug and/or alcohol use.

AUTONOMOUS NERVOUS WREATH & PUPIL SHAPE

An ANW and pupil shape confirmation process S117–S119 then ascertains the user's identity by detecting the ANW and pupil out of the selected iris image, followed by determining the identification parameters according to the detected shape of the ANW and pupil. The ANW shape is uniquely determined in the present invention through the use of a Medial Axis Transform applied to the selected iris image signal. The pupil shape is uniquely determined in the present invention through the use of edge detection and curve fitting algorithms as known in the art.

Autonomous Nervous Wreath

Further, in the respective embodiments of the present invention, the ANW and pupil confirmation process can be comprised of the steps of: detecting with step S117 (FIGS. 10B and 10C) an ANW and pupil from the selected iris image signal; computing with step S118 the identification parameters based on the shape of the ANW by transforming the two dimensional image signal of the detected ANW with the Medial Axis Transform and the shape of the pupil by edge detection and curve fitting algorithms as described above; and confirming with steps S119, S120 the user's identity by searching the corresponding identification parameters from the database.

Figure 13:
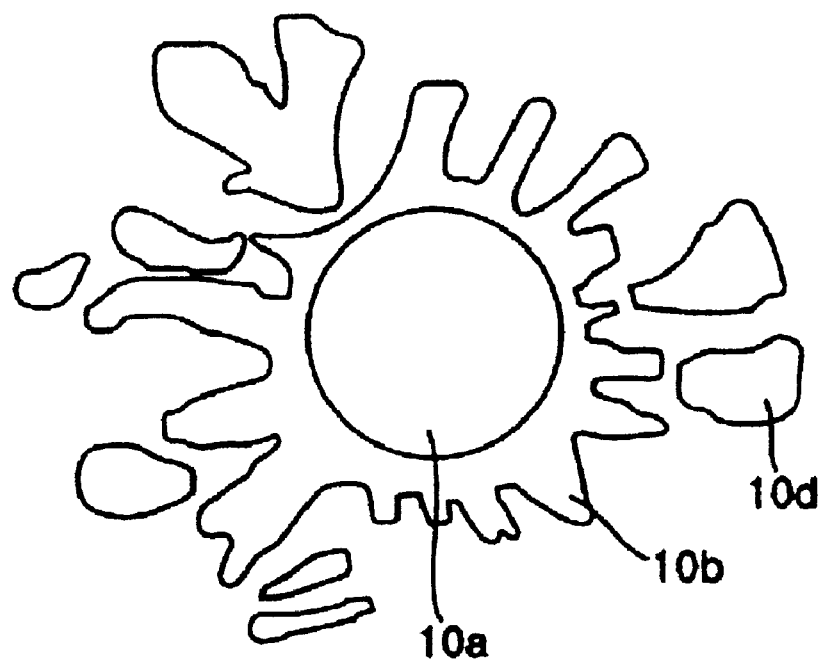
FIG. 13 is an exemplary view of the autonomous nervous wreath and lacuna where an edge of the iris image is extracted.
Figure 14:
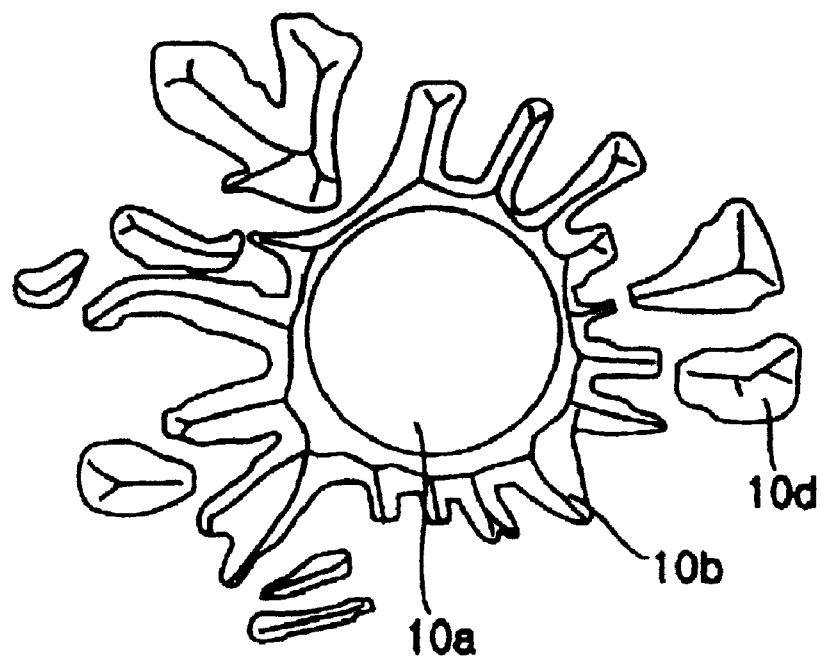
FIG. 14 is an exemplary view of the autonomous nervous wreath and lacuna of FIG. 13, which is transformed into one-dimensional data with the Medial Axis Transform.

FIG. 13 is an exemplary view of the ANW 10b and the lacuna 10d representing the edge detected from the iris image, and FIG. 14 is an exemplary view of the ANW 10b and the lacuna 10d showing the FIG. 13 in one dimensional data transformed by Medial Axis Transform.

The Medial Axis Transform of the object having specific shape, for example, is the locus of the centers of the circles tangent to the boundary of the object at more than two points. In other words, it is the locus of the nearest points from the object boundary. Therefore, since it is possible to transform the two-dimensional object into the one-dimensional data with the Medial Axis Transform, this can be applied to identify an ANW shape, and the shape and position of a pupil.

FIG. 18 is an exemplary view of the pupil and iris indicating shape, position, and identifying parameters. The shape of the pupil is uniquely determined in the present invention using an edge detection algorithm as known in the art. The pupil edge is generally indicated by reference character 10a in FIG. 18. Further, the center of the iris and pupil, respectively indicated by reference characters 10i and 10h on FIG. 18, are determined through geometry and used as identification parameters. The separation orientation and distance between the iris and pupil centers, generally indicated by reference character 10j, are used as identification parameters.

Further still, many pupils are not perfectly circular in shape, many are elliptical with variation in the orientation of the ellipses major axis. In a preferred embodiment, the orientation and magnitude of the ellipticity of the pupil is uniquely determined in the present invention using curve and shape fitting algorithms as known in the art. With reference to FIG. 18, the major and minor axes of the pupil ellipse are respectively indicated by reference characters 10m and 10n. The ellipticity of the pupil is expressed as the ratio of the minor axis 10n to the major axis 10m. Flat portions along the circumference of the pupil, generally indicated by reference character 10f in FIG. 18, as well as areas where the pupil is drawn in or out, respectively 10g and 10e, can be recognized and characterized to enhance recognition quality as farther identification parameters.

LACUNA DETECTION

A lacuna confirmation process S121–S127 is also used to ascertain the user's identity by judging whether the lacuna exists or not, detecting the lacuna zone if it exists, and then, determining the identification parameters on the basis of the detected location and shape of the lacuna.

In addition, in the iris identification method according to the present invention, the lacuna confirmation process can be applicable to the above embodiments by including at least one of the following plurality of processes depicted in FIG. 10C: a first lacuna confirmation process S121, followed by steps S125–S129 to ascertain the user's identity by judging whether the lacuna exists based on the acquired iris selected still image, then transforming the image signal of the lacuna zone with Medial Axis Transform if the lacuna exists, and determining the identification parameters based on the location and shape of the lacuna out of the transformation result. A second lacuna confirmation process S122–S124 occurs as a result of the first lacuna confirmation process if the lacuna does not exist, wherein the user may be accepted if there is no lacuna in the reference iris after re-judging whether a lacuna exists in the reference iris; conversely, the user is rejected as improper if there exists a lacuna in the reference iris.

Additionally, in each embodiment of the invention, the first lacuna confirmation process can be comprised of the steps of: judging with step S121 (FIG. 10C) whether a lacuna exists or not by detecting the edge of the iris image from the acquired still image signal of the iris; detecting with step S125 the lacuna zone, in case the lacuna exists as a result of the judging step; computing with step S126 the identification parameters on the basis of the shape and location of the lacuna after transforming a two-dimensional image signal of the detected lacuna zone with Medial Axis Transform; and confirming with steps S127–S129 the user's identity by searching the corresponding parameters from the database.

Further, in the respective embodiments of the invention, the second lacuna confirmation process can be comprised of the steps of: judging with step S121 whether the lacuna exists or not on the input image; re-judging with step S122 whether the lacuna exists or not in the reference iris, in case the lacuna does not exist on the input image; accepting with step S123 if a lacuna does not exist in the reference iris, and rejecting with step S124 in case the lacuna exists in the reference iris.

The operation and effect achieved by the invention constructed as above will now be described through use of an example.

Initially, the card number is read or the user's PIN is inputted by keystroke through the card reading unit 40 or key input unit 50. The card number and PIN confirmation process is carried out to determine whether the corresponding number exists by searching the card number or the PIN through the data storage unit 80 in the control unit 70.

If there is no corresponding number, the user is rejected as an un-identifiable user. If the corresponding number is found, then the control unit 70 accepts the user as an identifiable user and then transmits the control signal to the motor driving unit 30 to adjust the camera height to be suitable for the user after reading the additional personal information corresponding to the card number or PIN. At this time, the control signal compares the height difference between the present camera position and the camera position appropriate to the user, and then adjusts the camera height automatically by driving the motor in a forward or reverse direction. In addition, the width between the two eyes can also be adjusted for each user.

Next, with control unit 70, the adjustment of the initial auto-focusing is performed by lighting the infrared light source 12a by controlling the iris image pickup unit 20. The user is guided with the vision pointer 18 by switching on the vision guide light source 17 to prevent the iris image from biasing to one side. Hence, when capturing iris images, the eyesight of the person's iris image to be captured is fixed with the guide light source 17 (i.e., a thin blue light source) on the central portion of the lens.

The iris dynamic image is taken for a number of seconds while operating the flash light source 12b in a short cycle. All the light sources are then extinguished.

The iris image should be taken such that it can illustrate the varying shape of the pupil and ANW via the flash light source 12b controlled by certain software for a short time. For this purpose, more than 25 frames per second of the iris image are taken in the invention.

The successive images of the iris captured as described above are preprocessed in the data processing unit 60. Then, the image signal of the corresponding zone is selected after selecting the zone pertinent to the iris analysis. In a preferred embodiment, the analysis is performed on a sector by sector basis in accordance with the variable multisector system of spectral conversion described in detail above. In another embodiment, the zone used to analyze the iris is the horizontal strip region, including the entire pupil, depicted in FIG. 8, i.e. the portion seen clearly since it is not affected by eyelashes, eyelids or the like of the person being identified.

The control unit 70 performs the iris fiber structure confirmation process to ascertain the user's identity by using only selected low frequency components, as described in more detail above.

Next, in the control unit 70, the pupil and ANW reaction confirmation processes are performed to accept the captured image as representative of a living being if the contraction and dilation of the pupil and ANW are caused by the flash light source 12b, and to reject the captured image as not representative of a living being if there is no movement, after analyzing the reaction of the pupil and ANW from the iris dynamic image.

Subsequently, the ANW and pupil shape confirmation process is performed with control unit 70, which ascertains personal identity on the basis of the ANW and pupil shape by transforming the two dimensional image signal of the ANW zone having different characteristics in each person from the selected still iris image, with Medial Axis Transform (or Grass-Fire technique) as described above, into one dimensional data. Specific features of the pupil, as described above are also identified and compared.

The first and second lacuna confirmation processes are then carried out with control unit 70, which lastly confirms a user's identity via the identification method of identifying whether a lacuna exists or not, and the location and shape of the lacuna if it exists. As shown in the result of the Medial Axis Transform of the ANW, the lacuna is extracted from the selected iris still image in FIG. 13 and FIG. 14 through image treatment process; lacuna shape and location are used as identification parameters by representing the shape and location of a lacuna in one-dimensional data with the Medial Axis Transform when the lacuna shape is clearly seen through the edge detection.

Accordingly, the present invention has numerous advantages in that it can prevent financial accidents when applied to banking systems and electronic transaction/settlement systems, and preclude security-related accidents when applied to access control systems, since the invention offers a method of distinguishing a particular person by identifying the iris of a living human, not counterfeited, quickly and accurately by determining a plurality of parameters for iris identification using the iris fiber structure and texture form, pupillary and ANW reaction in response to light, the shape of the ANW and pupil, the existence, shape, and location of a lacuna acquired from the iris dynamic image.

What is claimed is:

1. A system for confirming the identity of an animate being through iris scanning, comprising:
    a) a control unit for receiving identifier information identifying the animate being, and a data storage unit including a data base accessed by the control unit for containing predetermined personal information associated with an identifiable being for comparison with identifier information;
    b) an iris image pick-up unit including a camera operated by the control unit when the identifier information corresponds to the predetermined information for capturing iris images to create input image signals; and
    c) a data processing unit for preprocessing the input image signals into processed data;
    wherein said storage unit includes, for the identifiable being, at least one of a plurality of pre-stored parameters for iris identification selected from the group consisting of (1) the density and texture from of the iris fiber structure using a frequency transformation method, (2) pupillary reaction, (3) the shape of the pupil, (4) autonomous nervous wreath reaction, (5) shape of the autonomous nervous wreath, (6) the existence of lacuna, (7) the location of the lacuna, and (8) the shape of the lacuna, said control unit being operable to compare the processed data with said parameter(s) to determine if there is a match indicative of a confirmation of identity.

2. The system of claim 1, wherein said camera is structured to photograph two eyes of said animate being, said data processing unit is operable to separately process image input into processed data signals representative of each eye.

3. The system of claim 2, wherein the same parameters are examined for each eye for identification purposes.

4. The system of claim 2, wherein different parameters are examined for each eye for identification purposes.

5. The system of claim 4, wherein the different parameters are selected for each eye as a function of being representative of a distinguishing characteristic(s) or feature(s) associated with that eye.

6. The system of claim 1, further comprising at least one of a card reading unit, and a key input unit for initially receiving inputted identifier information for transfer to said control unit.

7. The system of claim 1, wherein said iris image pickup unit includes a light source operated by the control unit in conjunction with the camera to capture, in succession, a plurality of iris images to create said input image signals.

8. The system of claim 7, wherein said light source is an infrared source.

9. The system of claim 1, wherein said predetermined personal information includes positioning data interfaced with said iris image pick-up unit through said control unit to automatically align the camera the user's eye.

10. The system of claim 1, wherein said processed data is representative of at least two of said parameters.

11. The system of claim 10, wherein said processed data is representative of all of said parameters.

12. The system of claim 1, wherein the frequency transformation method utilizes a Wavelet Transform.

13. The system of claim 12, wherein the frequency transformation method utilizes a Haar Transform.

14. The system of claim 13, wherein low frequency components of two-dimensional Haar Transform coefficients are obtained for identification purposes from a selected one of the input image signals.

15. The system of claim 13 wherein the Haar Transform is selected form a class of signum Haar functions.

16. The system of claim 13, wherein the Haar Transform is processed with a Butterfly Structure of a Transformation Flow Graph.

17. The system of claim 13, wherein at least a selected one of the input image signals is analyzed with a variable multi-sector system of spectral conversion using said Haar Transform functions.

18. The system of claim 17, wherein the multi-sector system of spectral analysis enables a variable selection of sectors of the iris representative of visible portions of the iris for analysis purposes that are not garbled by interference.

19. The system of claim 18, wherein said multi-sector system of spectral analysis enables defects or interferences with borders to be identified and excluded from the identification analysis.

20. The system of claim 19, wherein a selected one of the input iris images, for said spectral analysis purposes, is divided into an outer ring having an outer border located approximately at the border of the sclera-iris, and an inner circular portion, spaced inwardly from the outer ring, and having a radius spaced inwardly from the outer border by a predetermined distance.

21. The system of claim 20, wherein said predetermined distance is approximately 30–80 pixels.

22. The system of claim 21, wherein the outer ring, and an area within the circular zone disposed between the circular zone border with the outer ring and the periphery of the pupil, are each divided into a plurality of sectors (n) and (p) respectively, wherein n is the same or a different value from p, creating a total of n+p sectors wherein a predetermined number ($m^2$) of Haar coefficients are calculated using a Haar Transform forming a m×m matrix.

23. The system of claim 22, wherein n=16, p=16 and m=32, and for each of said 32 sectors, 1024 Haar function coefficients are calculated using a Haar Transform and from a 32×32 matrix.

24. The system of claim 23, wherein sectors occluded or interfered with by eyelids, eyelashes and the like, are rejected through adjacent sector Haar coefficient comparison.

25. The system of claim 22, wherein, by comparison of adjacent sector Haar coefficients, a sector is rejected as defective during analysis if a predetermined sharp variation of high frequency coefficients is detected.

26. The system of claim 25, wherein after removal of rejected sectors from the analysis, a subset of a complete set of $m^2$ Haar coefficients are selected to create a predetermined number of coefficients from the m×m matrix of $m^2$ Haar coefficients selected for analysis purposes.

27. The system of claim 26, wherein m=32 and said subset includes 31 coefficients selected from the 32×32 matrix of Haar coefficients.

28. The system of claim 26, wherein the selection of the predetermined number of coefficients is used to create an iris reference record.

29. The system of claim 28, wherein said predetermined number of coefficients are representative of a selected low frequency zone utilized for identification purposes.

30. The system of claim 1, wherein the processed data includes the shape of the pupil determined using at least one of a curve fitting and an edge detection algorithm.

31. The systems of claim 30, wherein the processed data includes the ellipticity of the pupil and orientation of the ellipse major axis.

32. The system of claim 30, wherein flat portions, if any, along the periphery of the pupil are recognized for identification purposes.

33. The system of claim 1, wherein said control unit calculates information representative of pupillary reaction by utilizing the input image signals to generate a pupil histogram or pupillogram representative of the average contraction and dilation of a pupil over time in response to light stimulus.

34. The system of claim 33, wherein said pupillogram confirms image scanning of a live animate being.

35. The system of claim 1, wherein said camera has a variable capturing or flex zone for auto focusing.

36. The system of claim 1, wherein said camera further includes a second lens having a focal length greater than 5 millimeters to prevent degradation of auto focusing as a result of movement of the user's eye.

37. The system of claim 36, wherein a plurality infrared of light sources are arranged in a circular array around the periphery of the second camera lens.

38. The system of claim 1, wherein said iris image pick-up unit further comprises a vision guide unit for aligning the user's eye with the camera lens.

39. A system for testing for the presence of drugs or alcohol within a person, comprising:
 a) a control unit for receiving identification information identifying the person;
 b) an iris image pick-up unit including a camera operated by the control unit for capturing iris images to create input image signals;
 c) a data processing unit for preprocessing the input image signals into processed data;
 wherein said control unit is operable to calculate the processed data taken as a result of the processing of said input image signals to represent the average contraction and dilation of the iris pupil in response to a light stimulus over time to thereby determine whether the processed data is indicative of actual or recent intoxication since the shape of the curve of the pupillogram is different when a person is intoxicated with alcohol or drugs relative to the shape of the curve when the person is alcohol or drug free.

40. The system of claim 39, wherein said control unit is operable to compare characteristics calculated from the pupillogram of the left and right iris pupil to thereby determine whether the processed data is indicative of actual or recent intoxication since the ratio of the left iris pupil characteristics to the right iris pupil characteristics is different when a person is intoxicated with alcohol or drugs relative to the shape of the curve when the person is alcohol or drug free.

41. The system of claim 40, wherein said characteristics for drug detection include at least one selected from the group consisting of (1) $D_{AB}$, (2) $\%A_1$, (3) $\%A_2$, (4) $S_P$, (5) $T_2-T_0$, and (6) $T_M$.

42. A method of testing for the presence of at least one of drugs and alcohol in a person's body, comprising the steps of:
 a) obtaining at a different time a plurality of images of substantially the same portion of the iris and pupil of a person;
 b) processing said plurality of images into a pupil histogram;
 c) calculate the characteristics of said pupil histogram processed in step (b); and
 d) confirming the presence of at least drugs or alcohol based on said characteristics of step (c).

43. The method of claim 42, wherein changes in the flatness characteristics of a curve associated with said pupil histogram are indicative of the presence of at least one of drugs and alcohol.

44. A method of confirming the identity of an animate being, comprising the steps of:
 a) initially determining whether the animate being has an identity corresponding to an animate being identified in a data base;
 b) if step (a) is yes, then obtaining a plurality of images representative of at least a portion of the iris and pupil of the being's eye;
 c) processing said plurality of images to obtain iris identification parameter information selected from the group consisting of at least one of the density and texture form of the iris fiber structure using a frequency transformation method, pupillary reaction, the shape of the pupil, autonomous nervous wreath reaction, shape of the autonomous nervous wreath, the existence of lacuna, the location of the lacuna, and the shape of the lacuna:
 d) comparing predetermined characteristics of said previously obtained iris identification information with said iris identification information obtained in step (c); and
 e) confirming whether there is a match indication of data compared in step (d).

45. The method of claim 44, comprising the further step of obtaining said plurality of images for each eye.

46. The method of claim 44, comprising the further step of initiating step (b) of claim 42 by matching inputted password information with previously stored information of an identifiable person.

47. The method of claim 44, comprising the further step of illuminating the eye with a light source followed by capturing, in succession, a plurality of said iris images.

48. The method of claim 47, wherein an infrared light source is used for illuminating.

49. The method of claim 44, comprising the further step of aligning the camera with the user's eye to obtain said plurality of images.

50. The method of claim 44, wherein said plurality of images are processed to obtain information pertaining to at least two of said identification parameters.

51. The method of claim 44, wherein each of said parameters are processed for identification purposes.

52. The method of claim 44, wherein a Wavelet Transform is used in processing step (c).

53. The method of claim 52, wherein a Haar Transform is used in processing step (c).

54. The method of claim 53, wherein the processing step includes obtaining low frequency components of two dimensional Haar Transform coefficients from a selected one of the input image signals.

55. The method of claim 53, wherein the processing step includes selecting the Haar Transform from a class of signum Haar functions.

56. The method of claim 53, where the processing step utilizes a variable multi-sector system of spectral analysis to enable a variable selection of sectors of the iris representative of visible portions of the iris to occur for analysis purposes that are not garbled by interference.

57. The method of claim 56, comprising the further step of utilizing said variable multi-sector system of spectral analysis to exclude from the identification analysis defects or interferences with borders to be identified.

58. The method of claim 56, wherein the processing step includes dividing the iris image into a predetermined number of sectors located within an outer ring and a circular area formed concentric with said outer ring which includes the pupil.

59. The method of claim 58, wherein said sectors are analyzed on a sector by adjacent sector basil and certain sectors are rejected as defective if a predetermined sharp variation of high frequency coefficients is detected.

60. The method of claim 59, wherein the processing step includes, after removal of rejected sectors determining, a subset of a complete predetermined number of coefficients which are selected for analysis purposes and the selection of the predetermined number of coefficients in the subset for each selected sector is used to create an iris reference record used in comparing step (d) of claim 42.

61. The method of claim 60, wherein coefficients representative of a selected frequency zone of selected sectors are utilized for identification purposes.

62. The method of claim 44, wherein the processing step includes analysis of the shape of the iris pupil utilizing at least one of a curve fitting and edge detection algorithms.

63. The method of claim 62, wherein the processing step includes detecting the ellipticity of the pupil and orientation of the ellipse major axis.

64. The method of claim 63, wherein the processing step utilizes determining the existence of flat portions along the periphery of the pupil.

65. The method of claim 44, wherein said plurality of iris images are acquired utilizing auto-focusing of a camera with a variable capturing or flex zone.

66. The method of claim 44, comprising the further step of utilizing previously stored information to automatically orient the eye with a source of obtaining said plurality of images in step (b).

67. The method of claim 42, wherein step a) further comprises obtaining images of the iris and pupil of the left and right eyes of a person and step d) further comprises comparing characteristics calculated from the pupillogram of the left and right iris pupil to thereby determine whether the processed data is indicative of actual or recent intoxication since the ratio of the left iris pupil characteristics to the right iris pupil characteristics is different when a person is intoxicated with alcohol or drugs relative to the shape of the curve when the person is alcohol or drug free.

68. The method of claim 67, wherein said characteristics for drug detection include at least one selected from the group consisting of (1) $D_{AB}$, (2) $\%A_1$, (3) $\%A_2$, (4) $S_P$, (5) $T_2-T_0$, and (6) $T_M$.

69. A method of identifying an iris of a user based on a reaction of a pupil and an autonomous nervous wreath associated with the iris comprising the steps of:
   a) confirming a user's identity by searching for previously stored personal information from a database properly accessed by the user;
   b) acquiring a series of images of the user's iris with a camera;
   c) initiating an iris fiber structure confirmation process to ascertain the user's identity by selecting an image signal of a zone of the iris from a selected one of the acquired images of the iris, and determining identity confirmation parameters from the image signal of the selected zone;
   d) initiating a pupillary and autonomous nervous wreath reaction confirmation process to ascertain the user's identity by detecting the zone of the pupil and autonomous nervous wreath from a selected one of the acquired iris images, computing the dynamic reaction (contraction and dilation) of the pupil and autonomous nervous wreath from the selected image signal of the detected zone of the pupil and autonomous nervous wreath, and determining associated identification parameters.
   e) confirming the user's identity by comparing the identification parameters with previous stored identification parameters as personal information.

70. The method of claim 69, wherein the image acquiring process comprises the steps of:
   automatically adjusting the camera position according to the user's previously stored personal information obtained from step (c) of claim 65;
   aligning and automatically adjusting the focus of the camera;
   switching on a light source to guide movement of the pupil and autonomous nervous wreath; and
   extinguishing the light source.

71. The method of claim 69, wherein the iris fiber structure confirmation process comprises the steps of:
   determining identification parameters out of Wavelet Transform coefficients associated with the corresponding iris fiber structure by transforming a selected image signal of the iris with a Haar Transform; and
   confirming the user's identity by searching for previous stored corresponding parameters from the database.

72. The method of claim 69, wherein step (d) of claim 65 comprises the steps of:
   computing parameters for identifying the shape of the autonomous nervous wreath by transforming a two-dimensional image signal from the detected autonomous nervous wreath zone with a Medial Axis Transform, and computing the shape of the autonomous nervous wreath at the detected zone.

73. A method of identifying an iris based on a reaction of a pupil and autonomous nervous wreath within the iris comprising the steps of:

a) confirming a user's identity by searching for previously stored personal information from a database properly accessed by the user;

b) acquiring a series of images of the iris with a camera;

c) initiating a pupillary and autonomous nervous wreath reaction confirmation process to ascertain the user's identity by detecting the zone of the pupil and autonomous nervous wreath from a selected one of the acquired iris images, computing the dynamic reaction (contraction and dilation) of the pupil and autonomous nervous wreath from the selected image signal of the detected zone of the pupil and autonomous nervous wreath, and determining associated identification parameters; and d) confirming the user's identity by comparing the identification parameters with previous stored identification parameters as personal information.

74. A method of identifying an iris, comprising the steps of:

a) confirming a user's identity by searching for previously stored personal information from a database properly accessed by the user;

b) acquiring a series of images of the user's iris with a camera; and c) initiating a first lacuna confirmation process to ascertain the user's identity, by detecting a lacuna zone from an acquired image if the lacuna exists, and determining identity confirmation parameters based on the shape and location of the lacuna.

75. The method of claim 74, further comprising a second lacuna confirmation process, if the lacuna does not exist, of confirming the user's identity if there also does not exist a lacuna in the reference iris, and rejecting the user as improper if there exists a lacuna in the reference iris.

76. The method of claim 75, comprising the further steps of:

detecting a zone of the pupil and autonomous nervous wreath by computing the central portion of a acquired iris image;

determining the identification parameters by computing the reaction (dilation or contraction) of the moving pupil and autonomous nervous wreath on the detected zone; and confirming the user's identity by searching the corresponding parameters from the database.

77. The method of claim 75, which comprises the further steps of:

detecting a zone of the autonomous nervous wreath out of the zone relating to a selected iris for analysis;

computing the parameters for identifying the shape of the autonomous nervous wreath by transforming a two-dimensional image signal on the detected autonomous nervous wreath zone with a Medial Axis Transform, and computing the shape of the autonomous nervous shape at the detected zone; and confirming the user's identity by searching the corresponding parameters from the database.

78. The method of claim 75, wherein the first lacuna confirmation process comprises the steps of:

judging whether a lacuna exists or not by detecting an edge of the iris image from the selected acquired image signal of the iris;

detecting a lacuna zone, if the lacuna exists as a result of the judging step;

computing the identification parameters on the basis of the shape and location of the lacuna after transforming a two-dimensional image signal on the detected lacuna zone with a Medial Axis Transform; and confirming the user's identity by searching the corresponding parameters out of the database.

79. A system for confirming the identity of an animate being through iris scanning, comprising;

a) a control unit for receiving identifier information identifying the animate being, and a data storage unit including a data base accessed by the control unit for containing predetermined personal information associated with an identifiable being for comparison with identifier information;

b) an iris image pick-up unit including a binoculars camera operated by the control unit when the identifier information corresponds to the predetermined information for capturing left and right eye iris images to create input image signals; and c) a data processing unit for preprocessing the input image signals into processed data.

* * * * *